(12) United States Patent
Wolfe

(10) Patent No.: US 12,298,773 B2
(45) Date of Patent: May 13, 2025

(54) APPARATUS, SYSTEM, AND METHOD OF PROVIDING HAZARD DETECTION AND CONTROL FOR A MOBILE ROBOT

(71) Applicant: JABIL INC., St. Petersburg, FL (US)

(72) Inventor: Charles Wolfe, St. Petersburg, FL (US)

(73) Assignee: JABIL INC.

( * ) Notice: Subject to any disclaimer, the term of this patent is extended or adjusted under 35 U.S.C. 154(b) by 728 days.

(21) Appl. No.: 17/044,018

(22) PCT Filed: Mar. 30, 2019

(86) PCT No.: PCT/US2019/024867
§ 371 (c)(1),
(2) Date: Sep. 30, 2020

(87) PCT Pub. No.: WO2019/191605
PCT Pub. Date: Oct. 3, 2019

(65) Prior Publication Data
US 2021/0124356 A1    Apr. 29, 2021

Related U.S. Application Data

(60) Provisional application No. 62/650,545, filed on Mar. 30, 2018.

(51) Int. Cl.
G05D 1/00       (2024.01)
B60Q 1/46       (2006.01)
B60Q 5/00       (2006.01)

(52) U.S. Cl.
CPC .............. *G05D 1/0214* (2013.01); *B60Q 1/46* (2013.01); *B60Q 5/005* (2013.01); *G05D 1/0088* (2013.01); *G05D 1/0251* (2013.01)

(58) Field of Classification Search
CPC .. G05D 1/0214; G05D 1/0088; G05D 1/0251; B60Q 1/46; B60Q 5/005
See application file for complete search history.

(56) References Cited

U.S. PATENT DOCUMENTS 9,538,892 B2   1/2017  Fong
9,632,504 B1   4/2017  Watts
(Continued)

FOREIGN PATENT DOCUMENTS

CN    103645733        3/2014
CN    105788161 A  *   7/2016
(Continued)

OTHER PUBLICATIONS

CN105788161A (translation) (Year: 2016).*
(Continued)

*Primary Examiner* — Ian Jen
*Assistant Examiner* — Renee LaRose
(74) *Attorney, Agent, or Firm* — Riverside Law LLP

(57) ABSTRACT

An apparatus, system and method capable of providing an autonomous mobile robot hazard detection and control system. The apparatus, system and method may include: a robot having a robot body; a plurality of sensors physically associated with the robot body, and capable of detecting a hazardous condition in an operational environment; and at least one processing system at least partially physically associated with the robot body and communicatively connected to the plurality of sensors. The at least one processing system may include non-transitory computing code which, when executed by a processor of the at least one processing system, causes to occur the steps of: mapping a navigation path for the robot to traverse; detecting the hazardous condition along the navigation path based on output from the plurality of sensors; and instructing at least one action by the robot other than following the navigation path, wherein the at least one action at least partially addresses the hazardous condition.

20 Claims, 5 Drawing Sheets

(56) References Cited

U.S. PATENT DOCUMENTS

| | | | |
|---|---|---|---|
| 10,365,646 B1* | 7/2019 | Farnsworth | G06Q 10/06 |
| 2005/0156562 A1 | 7/2005 | Cohen | |
| 2005/0248758 A1* | 11/2005 | Carron | G01J 3/44 |
| | | | 356/301 |
| 2007/0257910 A1 | 11/2007 | Gutmann | |
| 2010/0235088 A1 | 9/2010 | Li | |
| 2011/0054689 A1* | 3/2011 | Nielsen | G05D 1/0214 |
| | | | 700/258 |
| 2012/0035797 A1 | 2/2012 | Oobayashi | |
| 2014/0103224 A1* | 4/2014 | Ng | G01N 21/255 |
| | | | 250/435 |
| 2014/0350725 A1 | 11/2014 | Lafary | |
| 2015/0212521 A1 | 7/2015 | Pack | |
| 2015/0253777 A1 | 9/2015 | Binney | |
| 2016/0091899 A1 | 3/2016 | Aldred | |
| 2016/0129593 A1 | 5/2016 | Wolowelsky | |
| 2016/0375592 A1 | 12/2016 | Szatmary | |
| 2016/0375862 A1* | 12/2016 | Ito | G05D 1/0246 |
| | | | 348/148 |
| 2017/0028564 A1 | 2/2017 | Lowy | |
| 2017/0113352 A1 | 4/2017 | Lutz | |
| 2017/0285651 A1 | 10/2017 | Ji | |
| 2017/0357270 A1 | 12/2017 | Russell | |
| 2018/0005035 A1 | 1/2018 | Bogolea | |
| 2018/0038697 A1 | 2/2018 | Li | |
| 2018/0050698 A1 | 2/2018 | Polisson | |
| 2018/0059682 A1 | 3/2018 | Thode | |
| 2018/0137728 A1* | 5/2018 | Hahn | G08B 13/19697 |
| 2018/0275668 A1 | 9/2018 | Diehr | |
| 2019/0011950 A1 | 1/2019 | Shaw | |
| 2019/0022870 A1 | 1/2019 | Miyazaki | |
| 2019/0180150 A1 | 6/2019 | Taylor | |
| 2019/0204844 A1 | 7/2019 | Lau | |
| 2019/0235511 A1* | 8/2019 | Tiwari | G06Q 10/087 |

FOREIGN PATENT DOCUMENTS

| | | |
|---|---|---|
| CN | 105813526 | 7/2016 |
| CN | 106003047 | 10/2016 |
| CN | 107193283 | 9/2017 |
| CN | 206536514 | 10/2017 |
| CN | 107838927 | 3/2018 |
| KR | 20160104953 | 9/2016 |

OTHER PUBLICATIONS

Chinese Office Action issued in App. No. CN20198046224, dated Jan. 27, 2024, 5 pages.

Guangrui Fan et al, "Vision-based autonomous docking and re-charging system for mobile robot in warehouse environment", 2017 2nd International Conference on Robotics and Automation Engineering (ICRAE), IEEE, (20171229), doi:10.1109/ICRAE.2017.8291357, pp. 79-83, XP033320786.

Justinas Miseikis et al, "3D Vision Guided Robotic Charging Station for Electric and Plug-in Hybrid Vehicles", arxiv.org, Cornell University Library, 201 Olin Library Cornell University Ithaca, NY 14853, (Mar. 15, 2017), XP080757309, 6 pages.

Office Action (Non-Final Rejection) dated Mar. 21, 2024 for U.S. Appl. No. 17/251,682 (pp. 1-32).

Office Action (Non-Final Rejection) dated Sep. 22, 2023 for U.S. Appl. No. 17/251,682 (pp. 1-23).

The State Intellectual Property Office of People's Republic of China, First Office Action dated Apr. 28, 2023 for CN App. No. 201980046224, 7 pages.

Tsai Dorian et al, "Autonomous vision-based tethered-assisted rover docking", 2013 IEEE/RSJ International Conference on Intelligent Robots and Systems(ROS), IEEE, doi: 10.1109/IROS.2013.6696757, ISSN 2153-0858, (Nov. 3, 2013), pp. 2834-2841, (Dec. 26, 2013), XP032537837.

* cited by examiner

APPARATUS, SYSTEM, AND METHOD OF PROVIDING HAZARD DETECTION AND CONTROL FOR A MOBILE ROBOT

CROSS-REFERENCE TO RELATED APPLICATION

This application is a national stage application of International Patent Application No. PCT/US2019/024867, filed Mar. 29, 2019, entitled: APPARATUS, SYSTEM, AND METHOD OF PROVIDING HAZARD DETETION AND CONTROL FOR A MOBILE ROBOT, which claims the benefit of priority to U.S. Provisional Application No. 62/650,545, filed Mar. 30, 2018, entitled APPARATUS, SYSTEM, AND METHOD OF PROVIDING HAZARD DETECTION AND CONTROL FOR A MOBILE ROBOT, the entirety of which is incorporated herein by reference as if set forth in its entirety.

BACKGROUND

Field of the Disclosure

The disclosure relates generally to robotics, and, more particularly, to an apparatus, system, and method of providing hazard detection and control for a mobile robot.

Background of the Disclosure

In any environment in which pedestrians are present, there exists a risk of personal injury to the pedestrians due to foreign material on the walking surface. This walking surface may be indoors or outdoors. In either an indoor or an outdoor setting, the costs may be significant when one of the aforementioned injuries to a pedestrian occurs. Such costs may include time costs, such as activity or employment time missed, as well as actual medical costs incurred by the injured party in attempting to get well, and additionally may include liability costs, such as to the owners of the environment in which the injury occurred. Indeed, liability costs incurred may be most significant in an indoor environment in which the foregoing referenced pedestrians are invited to walk, such as for a retail environment in which goods are for sale.

Indeed, each year, one of the most significant costs incurred in certain retail environments may include liability costs for pedestrian injuries that occur; insurance costs to protect the retain environment if injuries do occur; and preventative costs in an effort to prevent such injuries from happening. Many retail environments also choose to spend on other significant additional costs to improve the shopping experience in a retail environment. For example, some retail environments now make significant expenditures to purchase autonomous mobile robots, such as for restocking, safety, security, customer assistance, loss prevention, and the like.

However, it is obvious that expenditures targeted to provide shopper safety from walking hazards, and expenditures intended to improve the shopping experience, when taken together may provide an exorbitant cost that must be absorbed by the retail provider. Nevertheless, it is typically that case that the two significant costs mentioned above remain disassociated at this time for retail environment providers.

SUMMARY OF THE DISCLOSURE

The disclosure is and includes at least an apparatus, system and method capable of providing an autonomous mobile robot hazard detection and control system. The apparatus, system and method may include: a robot having a robot body; a plurality of sensors physically associated with the robot body, and capable of detecting a hazardous condition in an operational environment; and at least one processing system at least partially physically associated with the robot body and communicatively connected to the plurality of sensors. The at least one processing system may include non-transitory computing code which, when executed by a processor of the at least one processing system, causes to occur the steps of: mapping a navigation path for the robot to traverse; detecting the hazardous condition along the navigation path based on output from the plurality of sensors; and instructing at least one action by the robot other than following the navigation path, wherein the at least one action at least partially addresses the hazardous condition.

BRIEF DESCRIPTION OF THE DRAWINGS

The disclosure is illustrated by way of example and not limitation in the accompanying drawings, in which like references indicate similar elements, and in which.

DETAILED DESCRIPTION

Figure 1:
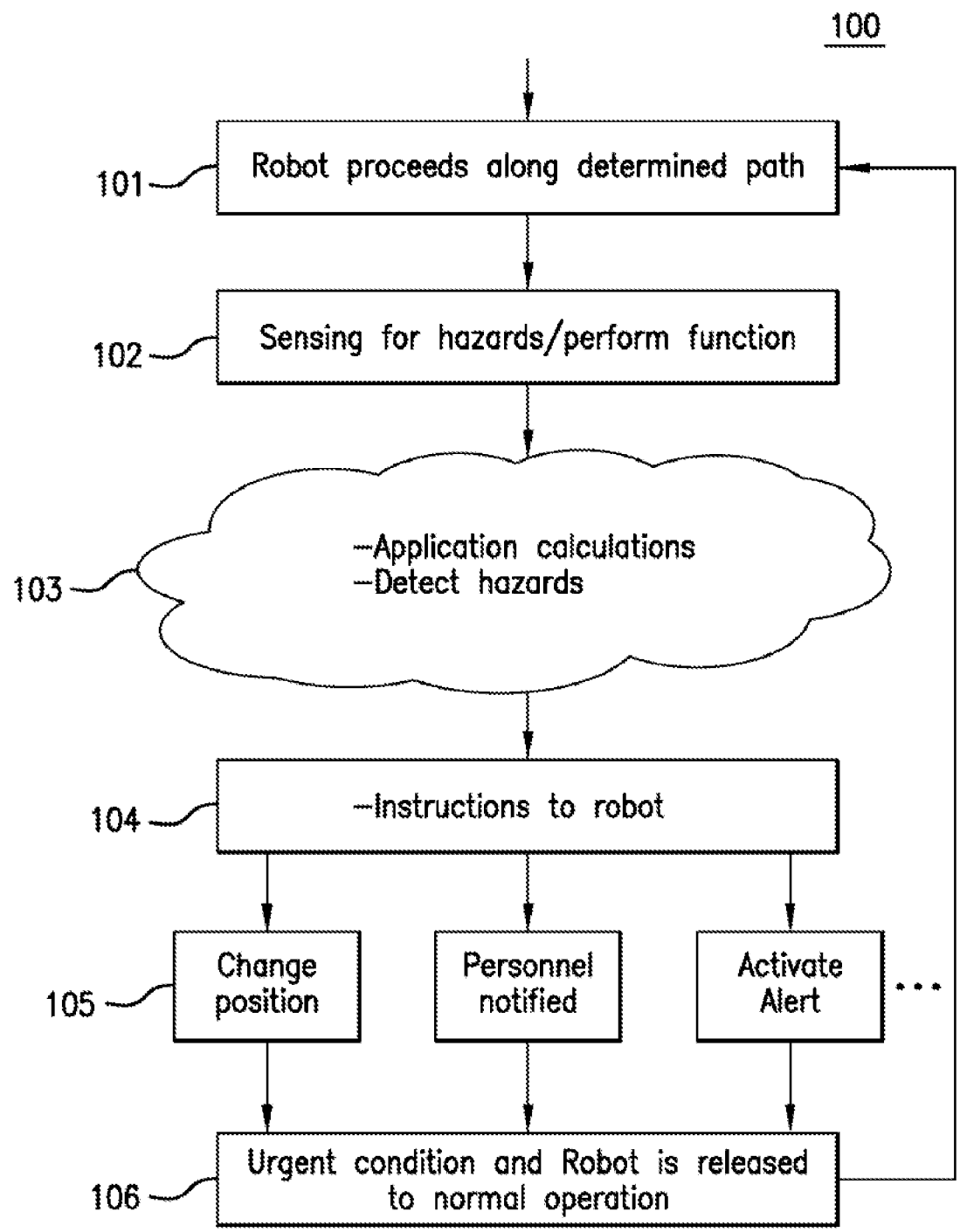
FIG. 1 illustrates an aspect of the disclosure.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

The embodiments address the significant costs in a retail environment of preventing pedestrian injury, and of providing mobile robotics for a variety of reasons, such as to improve the retail experience of consumers. That is, the embodiments use mobile robotics that may be dedicated to retail environment safety, or which may be present in a retail environment for reasons other than injury prevention, such as for security, restocking, inventory tracking, purchase advice, loss prevention, and so on, to aid in the prevention of pedestrian injuries within the retail environment.

More specifically, in the embodiments, an autonomous mobile robot may detect an urgent condition, and may accordingly perform one or more actions, such as alerting personnel to the urgent condition, wherein the one or more actions aid in the prevention of pedestrian injuries stemming from the urgent condition. As used herein throughout, an urgent condition may include a simple hazard, such as a spill, roof leak, or bottle breakage, or a more significant hazard, such as a partial roof or floor collapse, a shelving tip over, or a machine, such a forklift, operating in an area, by way of nonlimiting example.

Furthermore and by way of nonlimiting example, the robot may undertake not just one action, but may undertake combinations of multiple actions, such as proceeding to the location of the urgent condition and either remaining there until the issue is resolved, or until the robot has been automatically or manually released to return to normal activity. Of course, while at the location of the urgent condition, other actions may also include alerting pedestrians to the presence of the urgent condition so that pedestrians may avoid injury, such as through the use of lights, sounds, or combinations thereof, by way of nonlimiting example. The first and subsequent actions undertaken by the robot may be keyed to the occurrence of one or more triggers, and as such may be variable in accordance with an indication from one or more processing systems that at least partially control the robot.

Figure 2:
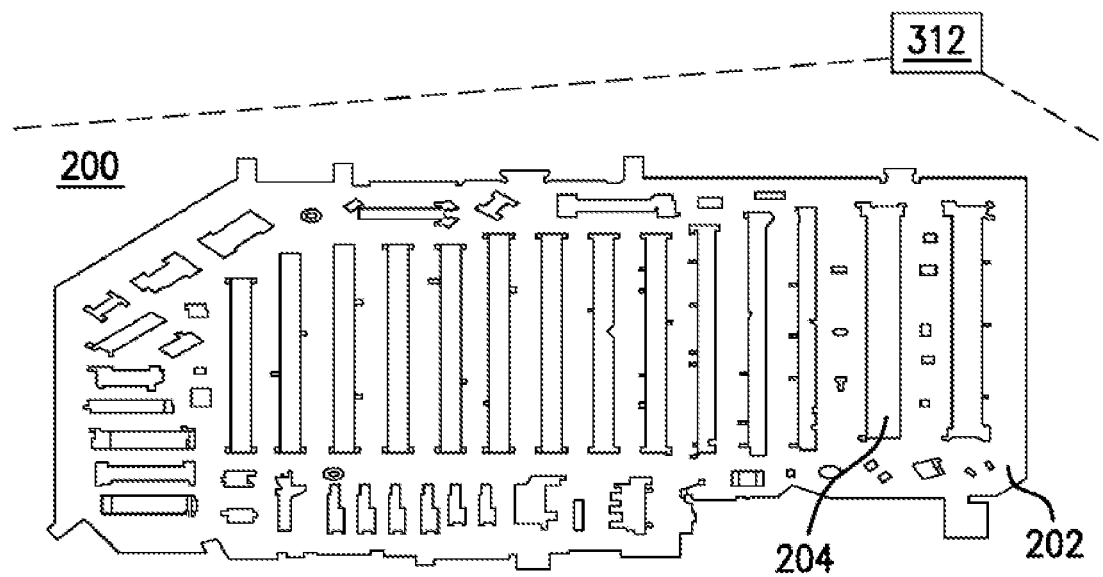
FIG. 2 illustrates an aspect of the disclosure.

More particularly, FIG. 1 is a flows chart illustrating an injury prevention work flow method 100 for performance by an autonomous mobile robot, such as may be executed by a processing system at least partially onboard the robot. At step 101, the robot may follow a predetermined path, such as around a retail environment, such as may have been provided to the robot previously, such as via a data upload to the processing system, and which aids the robot in performance of its stated function. By way of nonlimiting example, FIG. 2 illustrates a visual representative of data that provides a map 200 of pathways 202 and obstacles 204 in a particular retail environment. Upon processing of the map 200 by the processing system 312 of the mobile robot of the embodiments, the map may, at least in part, allow for the robot to autonomously navigate to perform its stated function.

More particularly and with respect to FIG. 2, the darker areas indicated in the map may represent objects or areas of interest, such as obstacles 204, to the robot along its planned path. By way of example, such areas of interest may include shelving that blocks motion but which also includes products to be monitored or restocked by the robot; checkout lanes or cash registers; permanent static obstacles within the environment; and the like. In contrast, the white areas illustrated in FIG. 2 may represent open floor areas 202, such as may be readily traversed by the mobile robot absent intrusion of a dynamic obstacle, such as a pedestrian.

Of note, the mobile robot may be enabled to follow a randomized path along the open floor path areas 202, as shown by way of example in FIG. 2, or may be provided with a consistent, predetermined path along which the robot should navigate upon execution of the data representative of that path by the processing system 312 of the robot. Further, it will be understood, such as in the aforementioned case of a dynamic obstacle intruding upon pathway 202, that the processing system may include additional actions to be undertaken by the robot in such cases.

Figure 3:
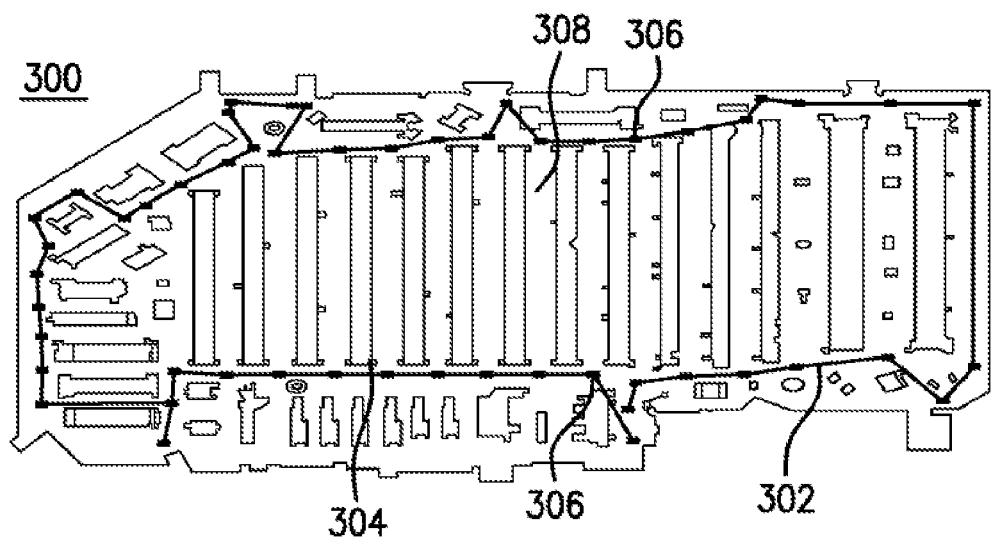
FIG. 3 illustrates an aspect of the disclosure.

More particularly, FIG. 3 illustrates an additional exemplary map 300 having a path plan 302 for navigating about the map 300 by a mobile robot. It will be appreciated that the path plan line 302 around obstacles 304 on the map 300 is representative of the path for the robot, and ones of the blocks 306 along the path 302 may illustrate locations whereat the robot may perform its stated function(s), such as taking pictures for security or loss prevention purposes, or taking pictures for hazard detection along the open aisles 308.

It should be noted that data may be gained by the robot at these function points 306 along its planned path 302, such as to enable the robot to perform its stated function. By way of nonlimiting example, at each block position 306 along the path 302, the robot may sense, such as by sensors, cameras, or the like, its position along a spatial axes (X, Y, Z), and/or its orientation in space (i.e., role, pitch, yaw). That is, either as the robot traverses its planned path 302, or at stopping points 306 along the path 302, or at both, the robot may assess various data points, such as the aforementioned six degrees of freedom for movement of the robot, and may feed this data to the processing system 312, such as to allow for performance of the method in accordance with the example of FIG. 1. Of course, it will be appreciated that various other data points may be taken and/or sensed by the robot, such as temperature, light levels, vibration levels, and so on, and in addition the robot may obtain data unrelated specifically to the position or operation of the robot, but instead related to its stated function, such as empty shelf space, number of persons in an aisle, detection of identifications, such as RFIDs, of as yet unpurchased items in a cart, and so on.

Returning now to the exemplary method 100 of FIG. 1, the robot may perform a function, such as hazard detection, such as by taking one or more pictures, or spectrographic or infrared assessments, at the stopping points 306 shown on the map of FIG. 3, or at other locations indicated by the path plan. This information may be fed to the processing system 312, such as the onboard, partially onboard, or off board robotic processing system, for analysis. By way of nonlimiting example, the obtained data at step 102 may be provided to one or more on board applications 490, or off board applications in the cloud, for analysis, such as image analysis or spectrographic or infrared analysis. In short, at step 102, data, which may be in addition to the data obtained by the robot in performance of the stated function, may be obtained for the purpose of hazard detection, and is provided to the processing system 312 for use by one or more applications onboard, partially off board, or off board the robot to analyze the data for hazard detection.

Figure 4:
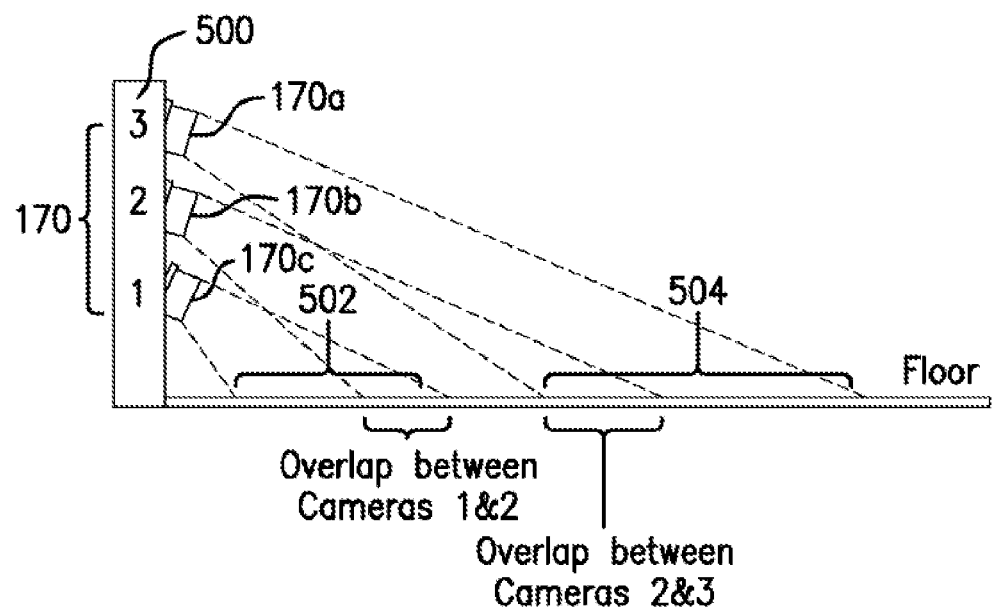
FIG. 4 illustrates an aspect of the disclosure.

FIG. 4 illustrates an exemplary embodiment of the obtaining of hazard data, such as may be performed at step 102 of FIG. 1. In the illustration, the sensors 170, such as cameras, onboard the robot 500 provide the robot with a field the view 502, 504, of one or more areas of the floor along the open areas in a retail environment. Of note, a single camera may provide a given field of view, while an array of cameras 170a, 170b, . . . , may be employed, such as in an overlapping manner, to provide a field of view. As such, it will be understood that, in accordance with the disclosure, an array of sensors or a single sensor may be employed to perform the hazard detection of step 102. It will be appreciated that the hazard detection may require further sensor data processing by the referenced application 490 (see FIG. 7), such as wherein a hazard is detected across multiple images from the array of cameras 170a, 170b but the multiple images must be overlaid by the application 490 in order to assess the extent of the hazardous condition.

Returning now to the method of FIG. 1, the application 490 may analyze the received sensor output 170, and may use this information to detect one or more hazardous conditions. Other data beyond that provided by the sensors 170 may be received by the application 490 in accordance with the embodiments, such as the position of the robot on the navigation map 300, the physical position of the robot in relation to its six degrees of freedom as discussed above, or the like. This may further enable refined detection and assessment of the urgent condition and its location within the retail environment. Also, in accordance with this step 103, if a hazard is detected the application 490 may provide an urgent notification to the robot, such as may include an action or additional action to be taken by the robot, such as to update the position of the robot to block or otherwise indicate to pedestrians the presence of the hazard, the actuation of the aforementioned alerts, such as lights or sounds, by the robot, and so on.

Figure 5:
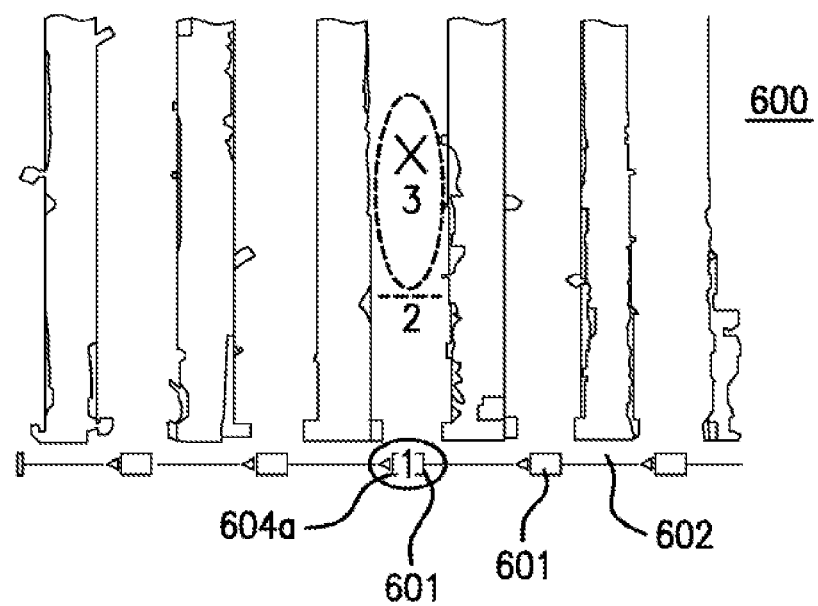
FIG. 5 illustrates an aspect of the disclosure.

FIG. 5 is a visual representation of data that provides a map 600 on which is detected and located a hazardous condition. More particularly, the "X" in FIG. 5 indicates the presence of an urgent location. The circled "1" indicates the sensing location 601 of the robot along its planned path 602 whereat the set of images represented by the data were uploaded to the application 490 which contain the image of the hazardous condition.

As referenced above with respect to step 103, based on the circle and the "X" within the data generated by the robot, the application 490 may elect what action or actions the robot should undertake; or these actions may be pre-stored at the robot based on the presence of triggers within the data obtained by the robot. By way of example of actions, the robot may first be sent back to the position whereat the picture indicating the urgent condition was generated. This is indicated by the stopping point block 604a within the circle of FIG. 5.

Additionally and alternatively, by more refined analysis of the received data, the application 490 may provide the robot with an action to move to a position closer to the hazard. By way of example, in a camera-sensing robotic embodiment, the application 490 may appreciate the intrinsic geometries of the fields of view for each of the cameras in the array, and thereby may be enabled to assess, such as based on the overlap of the field of view between the cameras, a highly refined position at which the urgent condition exists. By way of example, the position numeral "2" in FIG. 5 may indicate the first position at which an overlap between cameras in the field of view (shown by way of example for the camera array of FIG. 4) locates the hazard (shown by the dotted line field of view in FIG. 6). Accordingly, as the application 490 may assess this as the threshold that approximates the location of the hazardous condition, and the correspondent action indicated to the robot may then be to move to the position indicated by position numeral "2" in FIG. 5.

Of course, the data received by the application 490 from the sensors 170 may allow for a yet-more refined analysis than that referenced immediately above. More particularly, the sensors may enable the application 490 to determine a very highly precise location of the hazardous condition on the path plan map 600. Using this information, the application 490 may calculate, such as based on sensor data received 170, such as may include the intrinsic properties for one or more images from a camera or camera array, a very precise location where the hazard condition exists. This calculation by the application 490 is represented by the position numeral "3" in FIG. 5. Of course, the application may indicate to the robot that the robot reposition at position numeral "3" in circumstances in which, for example, the robot is to entirely block the hazardous condition such that pedestrians are disabled from encountering the hazardous condition.

Returning now to the embodiment of FIG. 1, at step 104 the robot may have been notified by the application 490 of the urgent scenario, and/or of the new position the robot is to undertake. Additionally, the robot may be provided with additional instructions to address the urgent condition. By way of example, the robot may be provided by the application 490, and/or by its pre-stored processing system 312 response to triggers, with multiple actions to be undertaken in order to protect pedestrians from the hazardous condition and to notify personnel of the necessity of treating the hazardous condition.

For example, at steps 104 and 105, the robot may be instructed to change its navigation path to move to the position indicated by the application 490, as discussed above. Additionally, the robot may provide a notification, such as to in-store personnel or to external personnel, such as may be available by one or more networked communications, such as over the Internet. Such a notification at steps 104 and 105 may include the sending of one or more messages via various communication means, such as by email and to one or more mobile devices, that the hazardous condition is present. Needless to say, it may be desired that redundancy occurs in such communications, such that multiple devices belonging to multiple personnel, such as via email and mobile communication, are automatically contacted in the embodiments, and such as mandating that multiple types of personnel, such as in-store and out-of-store, be contacted by the application 490 for all urgent conditions, or only if given urgent conditions occur.

Further, other actions may be directed and undertaken at steps 104 and 105, such as via onboard wired or wireless communication, such as by posting a message to an internal public address system; by the actuation of lights or sounds associated with the robot; and/or by the robot itself serving as a public address system, such as by providing a pre-recorded message, such as may be based on the hazardous condition sensed. Other actions may include instructions from the application 490, and/or instruction from one or more external locations connective to the processing system 312. These remote instructions may or may not be provided through the application 490, and may or may not arrive wirelessly at the robot.

As is further illustrated at step 105, the robot may undertake one or more actions, such as those indicated above, as indicated by the analysis by the application 490 (and/or a remote monitor) at step 104. For example, in performance of the actions, the robot may take up a new position indicated by the application; may flash lights, play sounds, and/or may play a warning message; may wirelessly provide a message to the in-store public address system to allow for the playing of an audible message announcing the presence of the hazardous condition; and/or may notify in-store or out-of-store personnel of the presence of the hazardous condition, by way of nonlimiting example. Of course, it will be understood, based on the discussion herein, that a variety of other actions may be undertaken by the robot at the instruction of the application 490, and/or based on the instruction by external or in-store personnel, and that the disclosure is not limited to the examples provided herein.

At step 106, the robot has successfully undertaken its action, and may accordingly automatically release itself to normal operation, such as after a predetermined time period or pursuant to sensing a different condition, such as the lack of the previous urgent condition; or may be manually released to its normal operation, such as by manual indication of the resolution of the hazardous condition to the robot from in-store or out-of-store personnel. In either case, such as following execution of all indicated actions, the robot may resume normal operation along its planned path for the performance of its stated function, such as the exemplary path illustrated in FIG. 3.

Figure 6:
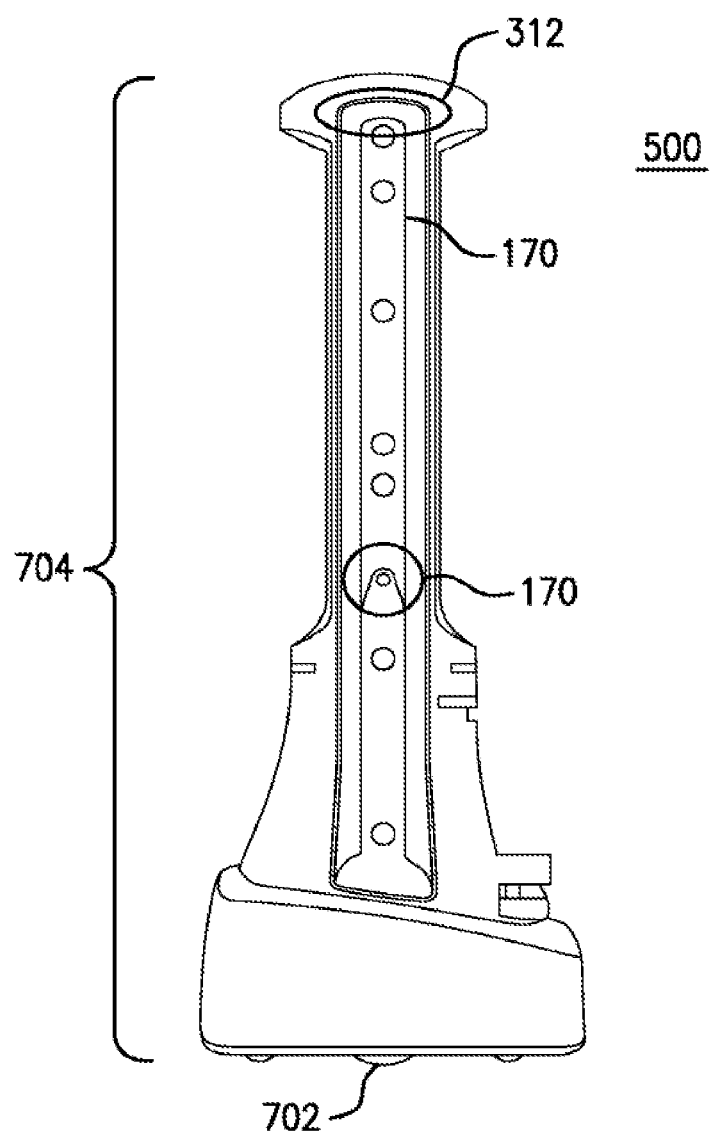
FIG. 6 illustrates an aspect of the disclosure.

FIG. 6 illustrates, by way of nonlimiting example, a robot 500 suitable for operation in accordance with the disclosed embodiments. More particularly and as shown, the robot 500 includes one or more wheels 702 in the body 704 thereof suitable to move the robot 500 about its plan path; one or more sensors 170, such as cameras, suitable for the robot to perform its stated function, and sense hazardous conditions; and one or more processing systems 312, such as may include wireless communication with external network environments, to allow the application to perform its functions as stated herein.

Figure 7:
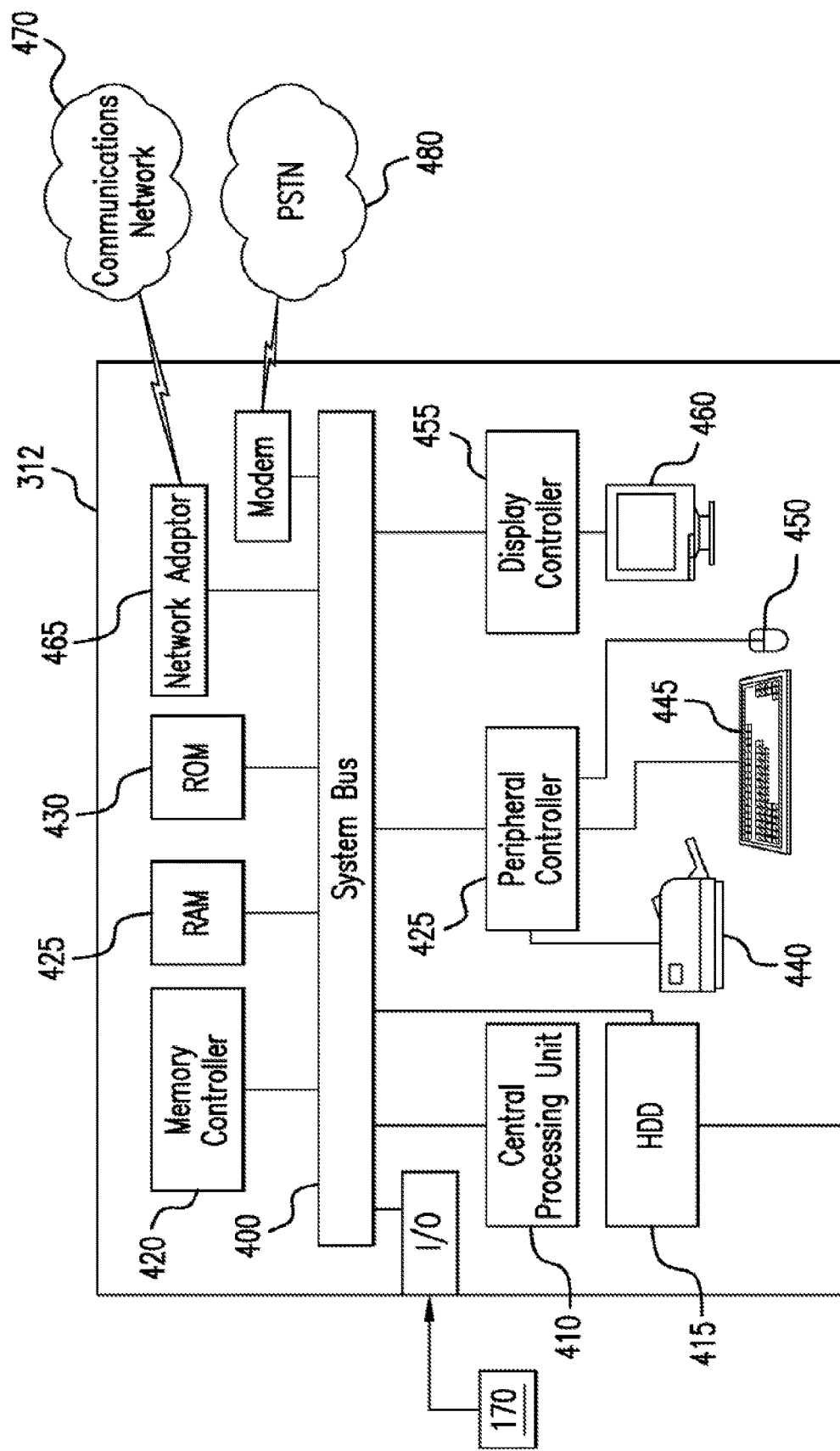
FIG. 7 illustrates an aspect of the disclosure.

FIG. 7 depicts an exemplary computer processing system 312 for use in association with the embodiments, by way of non-limiting example. Processing system 312 is capable of executing software, such as an operating system (OS) and the one or more computing algorithms/applications 490, such as those for the processing of inputs received from sensors 170 discussed throughout. The operation of exemplary processing system 312 is controlled primarily by these computer readable instructions/code 490, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 312 to perform the disclosed operations, comparisons and navigation calculations. In many known computer servers, workstations, personal computers, and the like, CPU 410 is implemented in an integrated circuit called a processor.

It is appreciated that, although exemplary processing system 312 is shown to comprise a single CPU 410, such description is merely illustrative, as processing system 312 may comprise a plurality of CPUs 410. Additionally, system 312 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 312 via the system's main data-transfer path. The main data-transfer path may use a system bus architecture 405, although other computer architectures (not shown) can be used.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420.

In addition, processing system 312 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 312, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 312 may contain network adapter 465 which may be used to couple to external communication network 470, which may include or provide access to the Internet, an intranet, an extranet, or the like. Communications network 470 may provide access for processing system 312 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. An autonomous mobile robot control system, comprising:
    a robot having a vertically elongated robot body;
    a plurality of sensors physically associated with the robot body, the plurality of sensors comprising an array of cameras vertically staggered along the vertically elongated robot body to create at least two overlapping fields of view, and capable of detecting a hazardous condition in an operational environment;
    at least one processing system at least partially physically associated with the robot body and communicatively connected to the plurality of sensors, the at least one processing system including non-transitory computing code which, when executed by a processor of the at least one processing system, causes to occur the steps of:
        mapping a navigation path for the robot to traverse;
        detecting the hazardous condition along the navigation path based on output from the plurality of sensors based on one of the at least two overlapping fields of view created from the vertically staggered array of cameras; and
        instructing at least one action by the robot other than following the navigation path, wherein the at least one action at least partially addresses the hazardous condition;
        wherein the at least one action comprises an automatic alerting comprising a wireless communication to multiple devices belonging to in-store and out-of-store personnel.

2. The control system of claim 1, wherein a purpose of the navigation path mapping is other than sensing hazardous conditions.

3. The control system of claim 2, wherein the purpose is one selected from the group consisting of security, restocking, inventory tracking, purchase advice, and loss prevention.

4. The control system of claim 1, wherein the at least one action comprises returning to a site of the hazardous condition.

5. The control system of claim 4, wherein the returning to the site further comprises blocking the site from pedestrians.

6. The control system of claim 1, wherein the alerting comprises an alerting of nearby pedestrians.

7. The control system of claim 6, wherein the alerting comprises a visual alerting.

8. The control system of claim 7, wherein the visual alerting comprises flashing lights.

9. The control system of claim 6, wherein the alerting comprises an audible alarm.

10. The control system of claim 1, wherein the hazardous condition is one selected from the group consisting of a spill, a tipped shelving, a presence of a machine, and a bottle breakage, a roof collapse, a floor collapse, or a roof leak.

11. The control system of claim 1, wherein the at least one action comprises automatically releasing to return to the navigation path plan.

12. The control system of claim 1, wherein the navigation path plan includes a plurality of predetermined stopping and sensing points.

13. The control system of claim 1, wherein the navigation path plan includes locations of a plurality of obstacles.

14. The control system of claim 1, wherein the navigation path plan is randomized.

15. An autonomous mobile robot control system, comprising:
    a robot having a robot body;
    a plurality of sensors physically associated with the robot body, and capable of detecting a hazardous condition in an operational environment;
    at least one processing system at least partially physically associated with the robot body and communicatively connected to the plurality of sensors each associated with a field of view, the field of view comprising a first field of view and a second field of view, the at least one processing system including non-transitory computing code which, when executed by a processor of the at least one processing system, causes to occur the steps of:
        mapping a navigation path for the robot to traverse, wherein the navigation path includes a sensing location;
        detecting the hazardous condition at the sensing location based on output from the plurality of sensors;
        repositioning the robot body from the sensing location to a second location proximate to the hazardous condition, and receiving an analysis of the detected hazardous condition based on an overlap from the first field of view and the second field of view;
        based on receiving the analysis, repositioning the robot body from the second location to a third location associated with the hazardous condition; and
        instructing at least one action by the robot other than following the navigation path, wherein the at least one action at least partially addresses the hazardous condition;
        wherein the at least one action comprises an automatic alerting comprising a wireless communication to multiple devices belonging to in-store and out-of-store personnel, wherein the at least one action further comprises a dynamic obstacle avoidance.

16. The control system of claim 1, wherein at least one of the plurality of sensors comprises a camera.

17. The control system of claim 1, wherein the external personnel do not comprise in-store personnel, wherein the robot body is located in an indoor setting in-store and the communication is sent external to the indoor setting.

18. The control system of claim 1, wherein the navigation path is based on at least on an orientation of space of the robot body.

19. The control system of claim 1, wherein the at least one action comprises providing a message to an internal public address system to be played.

20. The control system of claim 1, wherein the automatic alerting is sent only if a given urgent condition occurs.

* * * * *